(12) United States Patent
Gunther

(10) Patent No.: US 6,954,530 B2
(45) Date of Patent: Oct. 11, 2005

(54) ECHO CANCELLATION FILTER

(75) Inventor: Jacob H. Gunther, North Logan, UT (US)

(73) Assignee: Utah State University, Logan, UT (US)

( * ) Notice: Subject to any disclaimer, the term of this patent is extended or adjusted under 35 U.S.C. 154(b) by 0 days.

(21) Appl. No.: 10/759,626

(22) Filed: Jan. 16, 2004

(65) Prior Publication Data
US 2005/0008145 A1 Jan. 13, 2005

Related U.S. Application Data

(63) Continuation-in-part of application No. 10/616,001, filed on Jul. 9, 2003.

(51) Int. Cl.[7] ............................................. H04M 1/00
(52) U.S. Cl. .......................... 379/406.02; 379/406.06; 379/406.08
(58) Field of Search ...................... 379/406.01, 406.06, 379/406.08, 406.11

(56) References Cited

U.S. PATENT DOCUMENTS

| | | | |
|---|---|---|---|
| 4,131,767 A | 12/1978 | Weinstein ................. 179/170.2 |
| 4,268,727 A | 5/1981 | Agrawal et al. .......... 179/170.2 |
| 4,712,235 A | 12/1987 | Jones, Jr. ..................... 379/410 |
| 5,295,136 A | 3/1994 | Ashley et al. .............. 370/32.1 |
| 5,390,250 A | 2/1995 | Janse et al. .................. 379/410 |
| RE35,574 E | 7/1997 | Russell et al. .................. 380/6 |
| 5,675,659 A | * 10/1997 | Torkkola .................... 381/94.1 |
| 5,694,474 A | * 12/1997 | Ngo et al. ...................... 381/66 |
| 5,764,753 A | 6/1998 | McCaslin et al. ............ 379/389 |
| 5,909,646 A | * 6/1999 | Deville ......................... 455/313 |
| 5,999,956 A | * 12/1999 | Deville ......................... 708/322 |
| 6,002,776 A | 12/1999 | Bhadkamkar et al. ......... 381/66 |
| 6,151,397 A | 11/2000 | Jackson, Jr. II et al. ... 381/71.4 |
| 6,181,794 B1 | 1/2001 | Park et al. ................... 379/410 |
| 6,272,106 B1 | 8/2001 | Kawahara et al. .......... 370/201 |
| 6,434,110 B1 | 8/2002 | Hemkumar ................. 370/201 |
| 6,507,653 B1 | 1/2003 | Romesburg ............ 379/406.05 |
| 6,516,050 B1 | 2/2003 | Tasaki et al. ................... 379/3 |
| 6,529,606 B1 | 3/2003 | Jackson, Jr. II et al. ... 381/71.4 |
| 6,577,675 B2 * | 6/2003 | Lindgren et al. ........... 375/148 |
| 2002/0114445 A1 | 8/2002 | Benesty et al. ........ 379/406.01 |
| 2002/0181699 A1 | 12/2002 | Pham et al. ........... 379/406.08 |
| 2002/0191779 A1 | 12/2002 | Pham .................... 379/406.08 |

OTHER PUBLICATIONS

International Searching Authority, International Search Report for PCT/US04/17897, dated Jan. 3, 2005, 2 pages.
International Searching Authority, Written Opinion of the International Searching Authority for PCT/US04/17897, dated Jan. 3, 2005, 3 pages.
Schobben et al., "A Frequency Domain Blind Signal Separation Method Based on Decorrelation," IEEE Transactions on Signal Processing, vol. 50, No. 8, Aug. 2002, pp. 1855–1865.

(Continued)

Primary Examiner—Jefferey F. Harold
(74) Attorney, Agent, or Firm—John R. Thompson; Stoel Rives LLP

(57) ABSTRACT

An echo canceler includes an recursive least squares lattice to whiten a far-end signal $s_1(t)$ and provide whitened time delays. The echo canceler further decorrelates a microphone signal based on the whitened time delays to reduce echoes of the far-end signal $s_1(t)$ that are contained in the microphone signal $x_2(t)$. The echo canceler does not use a double-talk detector and avoids all problems inherent with their use. Thus, speaker phones, and other communication devices, can continuously operate in full-duplex mode of operation thereby providing natural conversational hands-free communication.

25 Claims, 7 Drawing Sheets

OTHER PUBLICATIONS

Torkkola, Kari, "Blind Deconvolution, Information Maximization and Recursive Filters," Motorola, Phoenix Corporate Research Laboratories, 2100 East Elliot Road, MD EL508, Tempe, AZ 85284, USA, 4 pgs.

Torkkola, Kari, "IIR Filters for Blind Deconvolution using Information Maximization," Motorola, Phoenix Corporate Research Laboratories, 2100 East Elliot Road, MD EL508, Tempe, AZ 85284, USA, 14 pgs.

Feder, et al., "Maximum Likelihood Noise Cancellation Using the EM Algorithm," IEEE Transactions on Acoustics, Speech, and Signal Processing, vol. 37, No. 2, Feb. 1989, pp. 204–216.

Glentis, et al., "A Unified View—Efficient Least Squares Adaptive Algorithms for FIR Transversal Filtering," IEEE Signal Processing Magazine, Jul. 1999, pp. 13–41.

Breining, et al., "Acoustic Echo Control—An Application of Very–High–Order Adaptive Filters," IEEE Signal Processing Magazine, Jul. 1999, pp. 42–69.

"Echo Cancellation Filter" parent patent application and drawings, Inventor Jacob H. Gunther, filed Jul. 9, 2003, pp. 1–31.

* cited by examiner

ECHO CANCELLATION FILTER

RELATED APPLICATIONS

This utility application is a cont.-in-part of U.S. patent application Ser. No. 10/616,001 filed Jul. 9, 2003 and entitled Echo Cancellation Filter and is hereby incorporated by reference.

TECHNICAL FIELD

The present invention relates to telecommunication filtering and, more specifically, to echo cancellation in communication links.

BACKGROUND OF THE INVENTION

Hands-free speaker phones continue to be increasingly popular in modern day society. Advantageously a speaker phone allows users free use of their hands and to move about in the proximity of the speaker phone. Speaker phones employ a loudspeaker and a microphone to establish a bi-directional voice communication link between a local user in a near-end location and a remote user in a far-end location. The loudspeaker transmits the speech of the remote user, and the microphone detects the speech of a local user.

Typically, the near-end location is an enclosure, such as a room or an automobile. The speech of the remote user is emitted from the loudspeaker, echoes throughout the enclosure, is received by the microphone, and is transmitted back to the remote user in the far-end location. The echoes create unacceptably disruptive feedback for the far-end user.

A solution is to incorporate an echo canceler to cancel echoes received by the microphone. Echo cancelers synthesize an echo signal that matches the echoes of the voice signal of the remote user that are received by the microphone. If the synthesized echo signal matches perfectly the actual echo received by the microphone, then a signal without echo is returned to the far-end location. Typically, the mechanism used to create the synthetic echo signal is a filter implemented in the time-domain, the frequency-domain, or operating in frequency subbands. The input to the filter is the signal from the far end (the same signal is emitted from the loud speaker). The filter output is the synthetic signal.

The echo canceler preferably uses an adaptive filter so that the filter's parameters (tap coefficients for time-domain implementations or bin weights for frequency-domain implementations) are modifiable to improve a match of the synthesized echo signal to the actual echo in the microphone signal. The closeness of the match between the actual and synthesized echo is typically measured by the power, or some other second-order statistic, in the echo canceled signal. A limitation of this measure is that it is accurate when only the remote user is speaking and the local user is not.

In conversations between people, the status of the conversation can be in one of four possible states. The event when the remote user is speaking but the local user is not is called "far-end talk." Conversely, the "near-end talk" event is when the local user is speaking but the remote user is silent. The "double-talk" event occurs when both users speak simultaneously. When neither person speaks, the event is called "silence." In a telephone conversation, people usually take turns speaking. Therefore, in the absence of any other sources of sound, the most common events are "far-end talk" and "near-end talk."

The three non-silence events can arise due to background noises or other sources of sound on either end of the communication link. For example, if there is a radio operating in the near-end, then the state of the conversation can be in either the near-end talk event (if no sound is coming from the far-end) or the double-talk event (if there is sound coming from the far-end). However, the state cannot be in the silence or a far-end talk event since these events require silence in the near-end. Music from a radio is an example of a persistent near-end acoustic source.

For the purpose of echo cancellation, it is important to distinguish between the four types of events. The echo canceler cannot distinguish speech from any other type of acoustic signal, such as music from a radio, the noise of a dishwasher, or a dog barking. Therefore, from the echo cancelers perspective, double-talk occurs whenever the loud speaker is broadcasting sound simultaneously with sound being produced in the near-end room regardless of the original source of those sounds. Due to background noises, double-talk may be the most common condition in a hands-free telephone conversation using speaker-phones.

During periods of silence and near-end talk, there is not a far-end signal being emitted from the loud speaker. Therefore, there are no echoes to be canceled and the echo canceler is turned off. When far-end talk is detected, the echo canceler adjusts the parameters of the adaptive filter to synthesize an echo signal that matches the echo signal arriving at the microphone. Typical echo cancelers can operate effectively only during far-end talk. When double-talk occurs, the microphone signal consists of a sum of a near-end signal and echoes of the far-end signal. The presence of the near-end signal in the microphone signal hinders proper echo synthesis. The effect produces audible echoes in the signal sent back to the far-end. To prevent the feedback of echoes, the echo-canceler suspends modification of the adaptive filter. Typically, an echo-canceler includes a double-talk detector to determine the presence of a double-talk event and signal the adaptive filter accordingly. During double-talk, the adaptive filter is still synthesizing an echo signal that can be used for cancellation. Only the time varying adjustment of the adaptive filter parameters is suspended.

While the adaptive filter modification is suspended the echo paths of the enclosure may change as people move and interact with objects. Changes in the enclosure response cause changes in the echoes of the far-end signal that arrive at the microphone. Because the adaptive filter modifications have been suspended, the synthetic echo produced by the adaptive filter still matches the old echo but not the new. When the old synthetic echo is subtracted from the microphone signal, that now contains echoes due to the new enclosure response, the echoes are not canceled. The near-end signal, along with the uncanceled portion of the far-end echo are returned to the far-end. Even small changes in the echo paths of the enclosure can lead to loud echoes in the signal returned back to the far-end. To avoid sending loud echoes to the far-end, the echo canceler switches into a half-duplex mode of operation and the far-end signal is set to zero. Half-duplex communication is unnatural and hinders communication.

The bulk of the research and development in the field of echo cancellation has focused on two problems. First, the adaptive filters in echo cancelers must have very long responses to accurately match the real enclosure response. This presents a significant problem in its own right and a great deal of research has attempted to find practical implementations of very long filters that converge quickly to the enclosure response during far-end talk event. The second main focus of echo cancellation research has aimed to improve the ability of double-talk detectors to determine the instant that double-talk begins to occur. To date, there has been relatively little attention paid to the possibility that the adaptive filter may be adaptable to cancel echoes during the double-talk event. Existing attempts at adaptive filtering during double-talk have not provided an adequate solution for echo cancellation.

One approach has been to use a blind deconvolution technique for adaptive filtering during double talk. Blind deconvolution is a technique for separating a convolutive mixture, such as a mixture that takes place over space and time. A straight forward application of blind deconvolution techniques produces at best only a filtered version of the near-end signal which gives it an unnatural quality.

An improvement to the blind deconvolution technique is to provide a short-term whitening, learn the echo path response on the whitened signal by blind deconvolution, and apply the adapted filter on the original unwhitened signal. The resulting gradient descent technique adapts very slowly and is too slow for real-time applications. Furthermore, this technique could only cancel long-delay echoes but not echoes occurring in the span of the short-term whitening process.

Thus, a need exists to provide an improved echo canceler system that modifies the adaptive filter parameters during double-talk and eliminates the need for half-duplex operation. Such an invention is disclosed herein.

SUMMARY OF THE INVENTION

The present invention provides an echo cancellation structure and technique for use in a communication link. The present invention has particular application with hands-free speaker telephones as it is effective in reducing echoes resulting from far-end signals. The echo canceler includes an adaptable filter that may be updated not only during far-end talk as in a traditional echo canceler but also during double-talk. The echo canceler receives a far-end signal and a microphone signal and produces an echo-canceled signal.

Internally, the echo canceler consists of adaptive processing elements that force the echo-canceled signal to be as statistically independent as possible from the far-end signal. The adaptive processing elements may include whitening processors or decorrelators and adaptive filters. An adaptive filter includes a vector of coefficients that are updated by an adaptation module.

The whitening processors or decorrelators remove correlation that exists between two or more signals. For example let $x_1(t)$, $x_2(t)$, $x_3(t)$ be three signals with cross correlation $R_x(i, j)=E(x_i(t)x_j(t))$, where i, j$\in$\{1, 2, 3\}. If these three signals are fed into a decorrelation processor, the corresponding outputs $y_1(t)$, $y_2(t)$, $y_3(t)$ have cross correlation $R_y(i, j)=E(y_i(t)y_j(t))$ that satisfies, $$R_y(i, j) = \begin{cases} 1 & i = j \\ 0 & i \neq j. \end{cases}$$

Generally, the number of inputs to a decorrelation processor and the number of outputs are equal.

A decorrelator can be configured to temporally decorrelate (whiten) a given signal by inputting to the decorrelator several time-delayed replicas of the signal. By letting $x_1(t)=s(t)$, $x_2(t)=s(t-1)$, and $x_3(t)=s(t-2)$ as in the previous example, temporal decorrelation is accomplished, i.e., $y_1(t)$, $y_2(t)$, and $y_3(t)$ are temporally decorrelated (or whitened) versions of the signal s(t). When a decorrelator is configured to temporally whiten a given signal, the decorrelator generally has the given signal as its only input. The decorrelator produces the time-delayed replicas of the given signal internally and outputs as many whitened samples as desired. Therefore, a whitening processor may have only one input but may have a large number of outputs.

Generally, the number of whitened outputs is equal to the number of delays of the input signal that are generated internally. The operations of temporal whitening and decorrelating multiple signals are both performed in the present invention. There are a wide variety of algorithms for whitening or decorrelating data that may be used.

The echo canceler receives the far-end signal and the microphone signal. Using the temporal decorrelator, the far-end signal is temporally whitened and then the microphone signal is decorrelated from the multiple whitened lags of the far-end signal. The result is a set of uncorrelated variables: uncorrelated lags of the far-end signal and a decorrelated microphone signal.

In one embodiment, the time delays of the far-end signal $s_1(t)$ are explicitly generated and input to a decorrelation processor to generate multiple whitened lags of the far-end signal. A second decorrelation processor is also used to remove the correlation between the microphone signal $x_2(t)$ and the whitened lags of the far-end signal. All of the whitened and decorrelated outputs are fed into a blind source separation adaptive processing module which extracts the echo canceled signal $y_2(t)$.

In an alternative embodiment, the echo canceler incorporates well known recursive least-squares (RLS) processing structures, a RLS systolic array or a RLS least-squares lattice-ladder structure, to perform both temporal whitening and decorrelation of the microphone signal. As can be appreciated by one of skill in the art, other variations and algorithms are also possible.

The initial whitening process is not strictly necessary to enable echo cancellation during a double-talk event. To one skilled in the art, whitening processing can be seen as performing a partial echo cancellation. Because the microphone signal consists of the near-end signal plus multiple time delays of the far-end signal, by decorrelating the microphone signal with time delays of the far-end signal, the echoes of the far-end signal in the decorrelated microphone signal will be reduced. However, decorrelation is only a second order statistical criteria.

To generate an echo canceled signal that is truly independent from the far-end signal, further processing is needed. One approach is to exploit the non-gaussianity of the near-end signal and force echo canceled signal to be statistically independent of the far-end signal by maximizing its non-gaussianity. This approach invariably involves the optimization of higher than second order statistical criteria. Another technique to force independence is to exploit the non-stationarity of the near-end signal. Exploiting non-stationarity will be readily understood by one of skill in the art. However, for exemplary purposes the non-gaussian measure of independence/separation is used as the selected criterion of measure.

The multiple, temporally decorrelated delays of the far-end signal and the decorrelated microphone signal are linearly combined by the adaptive filter to produce the echo canceled signal. The same set of signals are also presented to the adaptation module so that the adaptation module can compute updates to the adaptive filter coefficients. The adaptation module applies a blind source separation algorithm based on a criterion that measures the non-gaussianity of the echo canceled signal. It is desired to extract only one source, the near-end source signal, from the mixture of all the echoes that arrive at the microphone. Therefore, one-unit source separation algorithms will be recognized by one skilled in the art (of blind source separation/independent component analysis) as being an appropriate family of separation algorithms to be used by the adaptation module.

In an alternative embodiment, parallel source separation algorithms may be used. However, implementation of parallel source separation algorithms are more expensive, and only one of the computed outputs is kept in any event. Because the echo canceler measures the statistical independence between the echo canceled signal and the far-end signal, the echo canceler is capable of adapting during double-talk events. Therefore, the echo canceler of the present invention does not need to use a double-talk detector.

The same adaptation algorithm can be used during double-talk as during far-end talk only. Adaptation during double-talk avoids the situation leading to the need for switching into half-duplex communication. The communication is full-duplex all the time enabling natural face-to-face type telephone conversations between the near-end and far-end users.

A double talk detector is not needed in the present invention but may be used anyway to optimize performance. During double talk, the adaptation module should maximize the statistical independence between the echo canceled signal $y_2(t)$ and the far-end signal $s_1(t)$. This enables adaptation to changes in the room/enclosure response during double talk. When the double talk detector determines that there is a far-end signal only, the operation of the adaptation module may switch to minimize a second order statistical criteria (such as is common in existing echo cancelers) which may allow more rapid echo cancellation during far-end only talk.

In an alternative embodiment, an echo canceler includes a recursive least squares lattice to whiten a far-end signal $s_1(t)$ and provide time delays. The recursive least squares lattice is a highly efficient algorithm that allows for practical implementation. The echo canceler further includes a ladder structure, operating in parallel with the recursive least squares lattice, to decorrelate a microphone signal $x_2(t)$ based on the time delays to reduce echoes from the far-end signal $s_1(t)$.

Additional aspects and advantages of this invention will be apparent from the following detailed description of preferred embodiments, which proceeds with reference to the accompanying drawings.

BRIEF DESCRIPTION OF THE DRAWINGS

Non-exhaustive embodiments of the invention are described with reference to the figures in which.

DETAILED DESCRIPTION OF PREFERRED EMBODIMENTS

Figure 1:
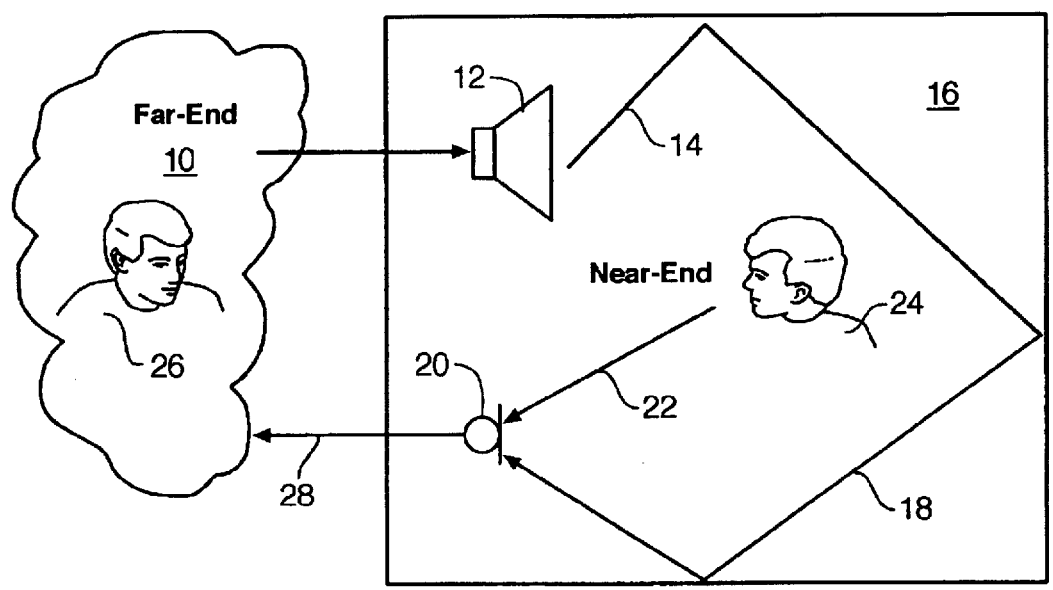
FIG. 1 is a block diagram illustrating a communication link having a loud speaker, enclosure, microphone, and a near-end user system.

Reference is now made to the figures in which like reference numerals refer to like elements. For clarity, the first digit or digits of a reference numeral indicates the figure number in which the corresponding element is first used.

Throughout the specification, reference to "one embodiment" or "an embodiment" means that a particular described feature, structure, or characteristic is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. Those skilled in the art will recognize that the invention can be practiced without one or more of the specific details, or with other methods, components, materials, etc. In other instances, well-known structures, materials, or operations are not shown or not described in detail to avoid obscuring aspects of the invention.

Referring to FIG. 1, a communication link is shown such as exists in a hands-free telephone conversation using speaker phones. A signal arrives from a far-end 10 and is transmitted through a loudspeaker 12. The resulting acoustic wave 14 propagates throughout an enclosure 16, such as a room. The wave 14 is reflected by hard objects such as walls, furniture, bodies, and produces an echo path 18. Only one echo path 18 is depicted in FIG. 1 for illustrative purposes, but as can be appreciated, in a real environment many echo paths exist.

A microphone 20 receives the echo path 18. Echoes vary in attenuation experienced during propagation and by differing echo path lengths. Therefore, the echo arrivals are spread out in time. The microphone 20 also receives a near-end acoustic wave 22 produced by, for example, a local person 24.

A remote person 26 at the far-end 10 of the communication link wants to hear the local person 24. Unfortunately, the microphone signal 28 is a mixture of both the desired near-end acoustic wave 22 and unwanted echoes 18 of the far-end acoustic wave 14. The echoes 18 should be removed from the microphone signal 28 so that the remote person 26 does not hear himself. Echo cancellation may be achieved through echo cancellation hardware and/or software.

Figure 2:
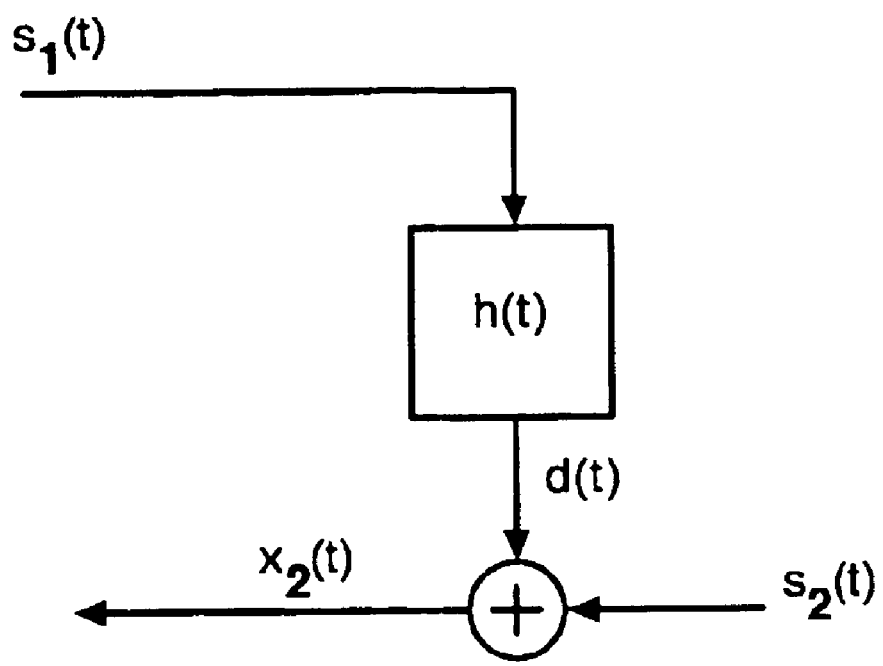
FIG. 2 is a block diagram illustrating a discrete-time signal processing equivalent of FIG. 1.

Referring to FIG. 2, a mathematical illustration of a discrete time signal processing equivalent of FIG. 1 is shown. In FIG. 2, d(t) is a superposition of all the echoes of the far-end signal $s_1(t)$. The function, h(t), is used to represent the echo path between the speaker 12 and the microphone 20. The near-end signal is $s_2(t)$ and the microphone signal $x_2(t)$ is the sum, $$x_2(t)=s_2(t)+d(t)=s_2(t)+h(t)*s_1(t),$$

where * represents a convolution.

Figure 3:
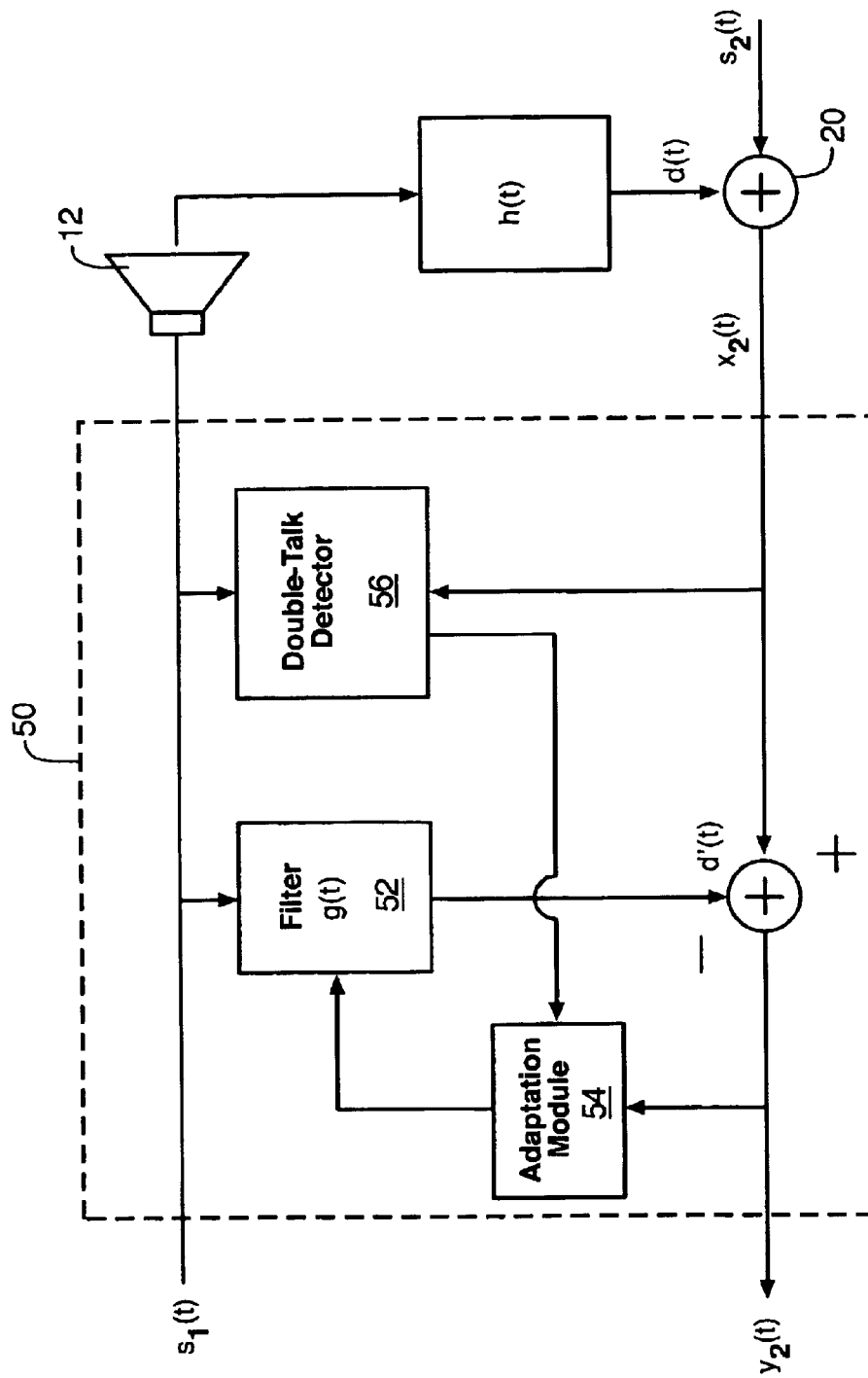
FIG. 3 illustrates a basic echo canceler configuration.

Referring to FIG. 3, a block diagram illustrates an echo canceler 50 incorporated into the mathematical illustration of FIG. 1. The echo canceler 50 is in electrical communication with the far-end signal and the microphone signal. The signals shown in FIG. 3 are set out in Table 1.

TABLE 1

Definitions of Signals

| Signal | Definition |
| --- | --- |
| $s_1(t)$ | far-end signal |
| $s_2(t)$ | Near-end signal |

TABLE 1-continued

Definitions of Signals

| Signal | Definition |
| --- | --- |
| $x_2(t)$ | microphone signal |
| $y_2(t)$ | Echo canceled signal sent back to far-end |
| $d(t)$ | Echo signal at the microphone |
| $d'(t)$ | estimated echo signal |
| $h(t)$ | impulse response of the enclosure from the speaker to the microphone |
| $g(t)$ | Echo cancellation filter |

The foregoing signal definitions are further used throughout the body of the present application.

The echo canceler 50 includes a filter 52 that provides a function, $g(t)$, to filter the far-end signal $s_1(t)$ and produce an estimate $d'(t)$ of the echo signal $d(t)$. The echo canceler 50 subtracts $d'(t)$ from the microphone signal, $x_2(t)$. The echo canceled signal, $y_2(t)$, may be written as, $$y_2(t)=s_2(t)+d(t)-d'(t)=s_2(t)+[h(t)-g(t)]*s_1(t).$$

When the echo estimation is perfect, $d'(t)=d(t)$, then the echo canceled signal reduces to $y_2(t)=s_2(t)$, which is the desired result. The echo canceler 50 returns to the far-end 10 a replica of the near-end signal $s_2(t)$ without an echo. Perfect echo cancellation is possible when $g(t)=h(t)$. When the response of the filter, $g(t)$, matches the actual echo response of the enclosure $h(t)$, then the echoes in the microphone signal $x_2(t)$ can be canceled by subtraction.

A practical strategy to achieve echo cancellation is to have the filter 52 be an adaptive filter. One such adaptive filter is a finite impulse response (FIR) filter that has a vector of coefficients that are modifiable.

The echo canceler 50 may further include an adaptation module 54 that is in communication with the filter 52 to provide coefficient updates. The adaptation module 54 receives the $y_2(t)$ signal which ideally is zero during the single-talk event of the remote user 26 speaking. The adaptation module 54 modifies the parameters in the function, $g(t)$, until the matching condition $g(t)=h(t)$ is achieved. In one implementation, the adaptation module may use a second order statistical criterion to adapt the filter function $g(t)$.

A limitation of this approach is that filters can only be adapted during the single-talk event in which only the far-end signal $s_1(t)$ is "on" and the near-end signal is $s_2(t)$ "off" so that $s_2(t)=0$. During this event, the undesired echo signal $d(t)$ entirely comprises the microphone signal $x_2(t)$. The adaptation module is then able to determine if subtraction of the estimated echo signal $d'(t)$ from $x_2(t)$ eliminates the echo signal $d(t)$.

The echo canceler 50 further includes a double-talk detector 56 in communication with $x_2(t)$ to identify a double-talk event. During a double-talk event, the double-talk detector 56 signals the adaptation module 54 to suspend adaptation of $g(t)$. During double-talk, $g(t)$ is still producing echo estimates, $d'(t)$, but the filter parameters are not updated.

Another consideration is that the enclosure is rarely static. For example, doors and windows may open and close, people may move, enter and leave, and people may move objects. These events may occur while updates to $g(t)$ are turned off and change the echo impulse response $h(t)$. If $h(t)$ changes while the updating to $g(t)$ is turned off, a residual echo is introduced into the echo canceled signal, $y_2(t)$. The residual echo depends on the difference between $h(t)$ and $g(t)$ and is given as, $$\text{residual echo}=d(t)-d'(t)=[h(t)-g(t)]*s_1(t).$$

The size of the residual echo depends on the size of the error, $h(t)-g(t)$. If large enough changes take place in $h(t)$, large echoes are introduced into the echo canceled signal $y_2(t)$. To avoid sending loud echoes back to the far-end 10, the echo canceler 50 goes into a half-duplex mode of operation in which $y_2(t)$ is set to zero. Half-duplex communication enforces the single-talk condition but is unnatural and very annoying to people.

The present invention provides an echo canceler that effectively updates an echo cancellation filter function $g(t)$ during double-talk and thus avoids the need for double talk detection and half-duplex operation. The present invention forces the echo canceled signal $y_2(t)$ to be statistically independent of the far-end signal $s_1(t)$. In so doing, the present invention addresses echo cancellation as a blind source separation problem in which the source signals can be divided into two independent groups. A first group includes the many correlated echoes, $s_1(t-i)$, of the far-end signals $s_1(t)$. All of the correlated echoes are weighted and summed together to form the signal, $$d(t)=\sum_{l=0}^{L-1}h(l)s_1(t-l).$$

A second group includes the single near-end signal, $s_2(t)$. This allows blind source separation techniques to be applied with modifications to account for different assumptions. Usually, algorithms for separating instantaneous mixtures are simpler in mathematical derivation and in computational aspects of algorithms than those for separating convolutive mixtures.

In the blind source separation problem, a collection of N independent signals $s_1(t), \ldots, s_N(t)$ arrive at N sensors, such as microphones. The sensors are situated so that each sensor obtains an independent observation of the sources. The sensor signals are given by, $$x_i(t)=\sum_{j=1}^{N}a_{i,j}s_j(t),$$

where $i=1,\ldots,N$. These equations can be summarized using a single matrix/vector equation, $$x(t)=As(t),$$

where, $$x(t)=\begin{bmatrix}x_1t\\\vdots\\x_Nt\end{bmatrix},\ A=\begin{bmatrix}a_{1,1}&\cdots&a_{1,N}\\\vdots&&\vdots\\a_{N,1}&\cdots&a_{N,N}\end{bmatrix},\ s(t)=\begin{bmatrix}s_1(t)\\\vdots\\s_N(t)\end{bmatrix}.$$

Several different techniques exist for recovering the sources $s(t)$ from the measurements $x(t)$. A general division exists between those methods that extract sources one at a time (called single-unit algorithms) and those that separate the sources all at once (called parallel algorithms). For the echo-cancellation application, a one-unit algorithm is used. Therefore, the essential elements of the one-unit algorithms will be presented.

Blind source separation of the sources is possible by exploiting the fact that the probability density function of a mixture of independent signals tends to be more gaussian than the probability density function of any of the independent signals. Because the mixing is linear, the separation operation is also linear. Where $y(t)=wx(t)$ is a linear component, separation can be accomplished by forcing y(t) to be non-gaussian in nature. Separation amounts to choosing the right w and the next step is a method for measuring the gaussianity of y(t).

In one embodiment, the negentropy may be used as a candidate measure although other measures may be used such as kurtosis. A reasonable approximation to negentropy is given by, $$J(y) \approx [E\{G(y)\} - E\{G(v)\}]^2,$$

where E is the expectation operator, v is a zero-mean, unit-variance guassian random variable, and G(y)=log cos h y. An independent component is extracted, i.e., and independent source is separated, by maximizing $J(y)=J(w^T x)$. That w have a unit length $\|w\|_2=1$ is important to the optimization of negentropy. A spatial whitening preprocessing step is also required.

Application of the blind source separation is now made with respect to an echo cancellation filter. A microphone signal $x_2(t)$ may be given as, $$x_2(t) = s_2(t) + \sum_{l=0}^{L-1} g(l) s_1(t-l) = [g(L-1) \ldots g(1)\_g(0)\_1] \begin{bmatrix} s_1(t-L+1) \\ \vdots \\ s_1(t-1) \\ s_1(t) \\ s_2(t) \end{bmatrix}.$$

The samples of the far-end signal, $s_1(t)$, can be thought of as perfect measurements of different sources albeit strongly correlated sources. Echo cancellation amounts to separation of the source of the near-end signal, $s_2(t)$, from the mixture of the microphone signal, $x_2(t)$. The echo cancellation can be put into the form of a blind source separation problem as follows, $$x(t) = \begin{bmatrix} s_1(t-L+1) \\ \vdots \\ s_1(t) \\ \hline x_2(t) \end{bmatrix} = \begin{bmatrix} 1 & & & & | & 0 \\ & \cdot & & & | & \cdot \\ & & \cdot & & | & \cdot \\ & & & 1 & | & 0 \\ \hline h(L-1) & \cdot & \cdot & h(0) & | & 1 \end{bmatrix} = As(t).$$

Since the sources are not independent but rather can be divided into two independent groups (corresponding to the strongly correlated delays of the far-end signal $s_1(t)$ and the single sample of the near-end signal $s_2(t)$), the equation does not fit the blind source separation exactly. However, the near-end signal, $s_2(t)$, is independent of any of the other signals $s_1(t-i)$ and that is all that is required. In blind source separation, the missing matrix A is unknown. However, in the echo cancellation application, the missing matrix is known except for the first L elements on the last row since this is the unknown impulse response of the enclosure.

Before applying the one-unit negentropy separation algorithm to the blind echo cancellation problem, the data x(t) is whitened. In one embodiment, for whitening, an efficient RLS lattice-ladder structure may be used. The gradient negentropy algorithm is then applied to separate $s_2(t)$ from $x_2(t)$. One of skill in the art will appreciate that any number of other optimization algorithms may also be used and would be included within the scope of the invention. Thus, gradient descent is used herein for exemplary purposes only.

Figure 4:
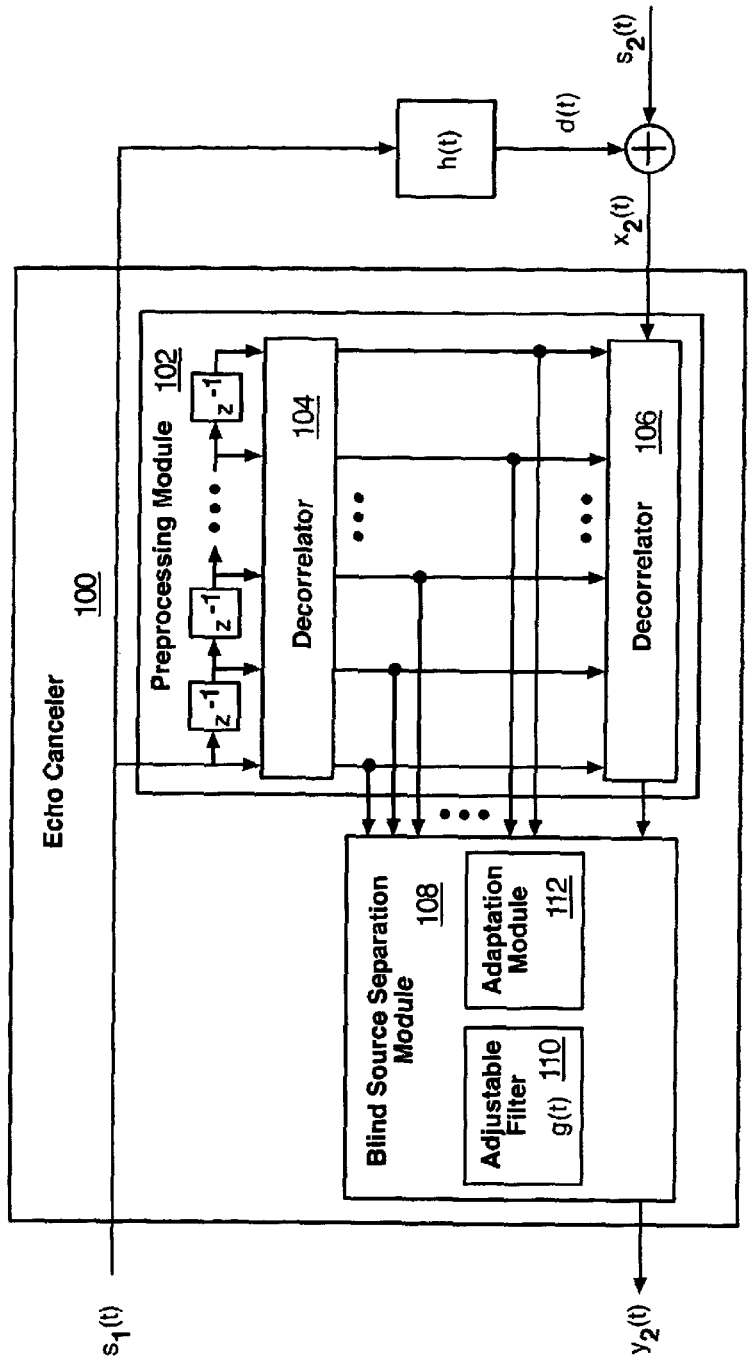
FIG. 4 is a block diagram illustrating an embodiment of elements of an echo canceler.

Referring to FIG. 4, a block diagram is shown illustrating elements of the echo canceler 100 of the present invention.

The echo canceler 100 includes a preprocessing module 102 to receive and whiten the far-end signal $s_1(t)$ and receive the microphone signal $x_2(t)$ and remove correlation. The preprocessing module 102 includes first and second decorrelators 104, 106 serve to whiten and separate signals that have been overlapped. In the present invention, the first decorrelator 104 temporally whitens the far-end signal $s_1(t)$ and the second decorrelator 106 removes correlation between the microphone signal $x_2(t)$ and the whitened lags of the far-end signal $s_2(t)$. The second decorrelator 106 receives whitened lags from the first decorrelator 104 in order to compare and remove the far-end signal $s_2(t)$.

The entire set of decorrelated signals, the whitened lags of $s_1(t)$ and the decorrelated version of $x_2(t)$, are input to a blind source separation module 108. The blind source separation module 108 includes an adjustable filter 110 having adjustable coefficients. The adjustable filter 110 has a filtering function g(t) that has a vector of adjustable coefficients. The adjustable filter 110 may be a FIR other filters may be used as well. The adjustable filter 110 weights and combines the set of inputs to produce the echo canceled signal $y_2(t)$.

The blind source separation module 108 further includes an adaptation module 112. The adaptation module 112 adjusts the filter coefficients to make the echo canceled signal $y_2(t)$ statistically independent of the far-end signal $s_1(t)$ in accordance with blind source separation techniques discussed above. The echo cancellation problem is cast as a one-unit blind source separation problem. A one-unit blind source separation algorithm emphasizes a measure of criteria to increase the statistical independence of the near-end signal. In one embodiment, negentropy maximization of the near-end signal can be used to extract the echo canceled signal.

An example of a gradient update algorithm for minimizing the negentropy of $y_2(t)$ is as follows:
 1. Choose an initial $w_0$ of unit norm $\|w\|_2=1$, an initial value for $y_0$, and let k=0;
 2. Update $w'_{k+1}=w_k+\alpha \gamma_k x_k g(w_k^T x_k)$;
 3. Normalize $w_{k+1}=w'_{k+1}/\|w'_{k+1}\|_2$;
 4. Update $\gamma_{k+1}=(1-\alpha)\gamma_k+\alpha[G(w_k^T x_k)-E\{G(v)\}]$;
 5. Increment k and go to Step 2.

In one embodiment of this algorithm G(y)=log cos h(y) and g(y) is the derivative of G(y), g(y)=tan h(y). Other functions could also be used. For example, if $G(y)=y^4$ a kurtosis maximization algorithm results. The main requirements are that G(y) be a smooth even function that does not grow too fast so that the algorithm is robust to outliers in the data.

Figure 5:
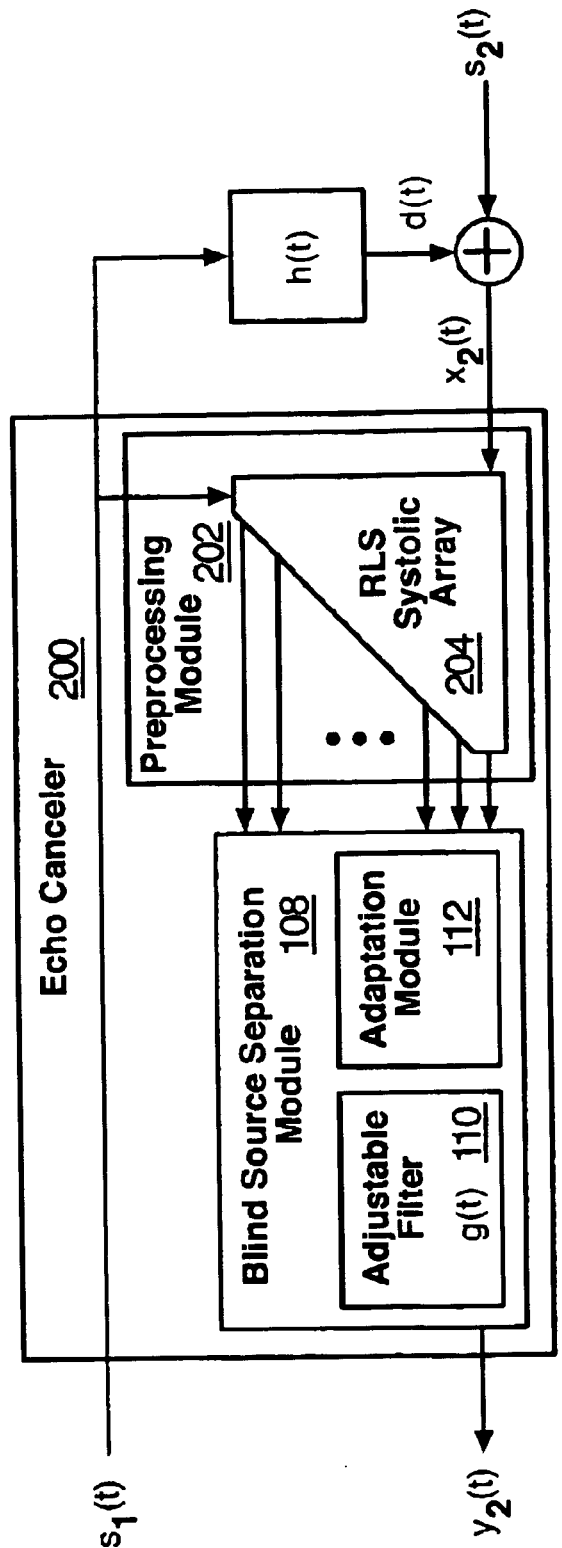
FIGS. 5 is a block diagram illustrating an embodiment of an echo canceler.

Referring to FIG. 5, an alternative embodiment of an echo canceler 200 is shown. The echo canceler 200 includes a preprocessing module 202 having a recursive least-squares processing structure such as a RLS systolic array 204. The RLS systolic array 204 receives the far-end signal $s_1(t)$ and performs a temporal whitening. The RLS systolic array 204 also receives the microphone signal $x_2(t)$ and decorrelates the signal. The blind source separation module 108 is similar to that previously described.

Figure 6:
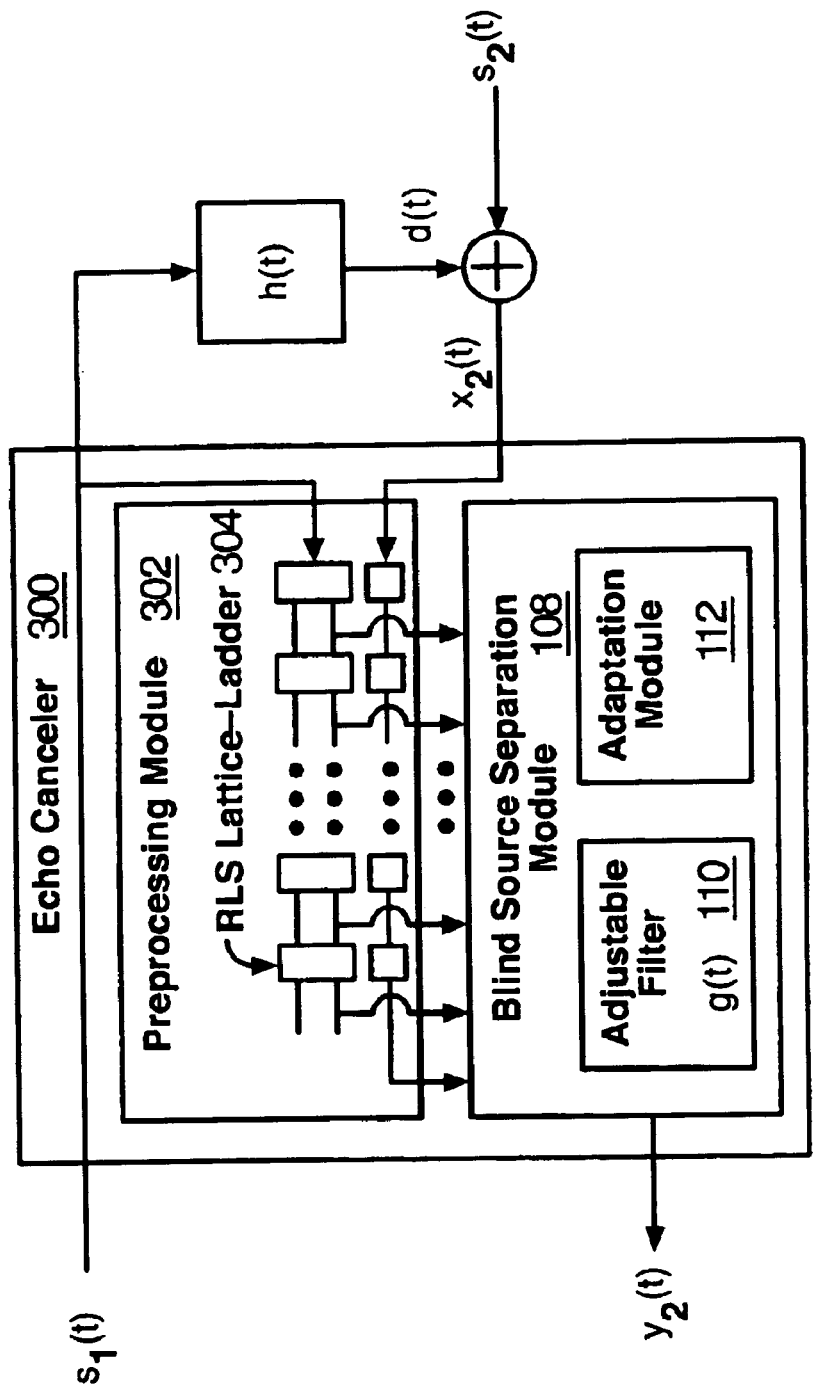
FIG. 6 is a block diagram illustrating an alternative embodiment of an echo canceler.

Referring to FIG. 6, an alternative embodiment of an echo canceler 300 is shown. A preprocessing module 302 includes a RLS lattice-ladder structure 304 to perform both temporal whitening of the far-end signal $s_1(t)$ and decorrelation of the microphone signal $x_2(t)$. As can be appreciated by one of skill in the art, other variations of the preprocessing module 302 are possible and are included within the scope of the invention.

Figure 7:
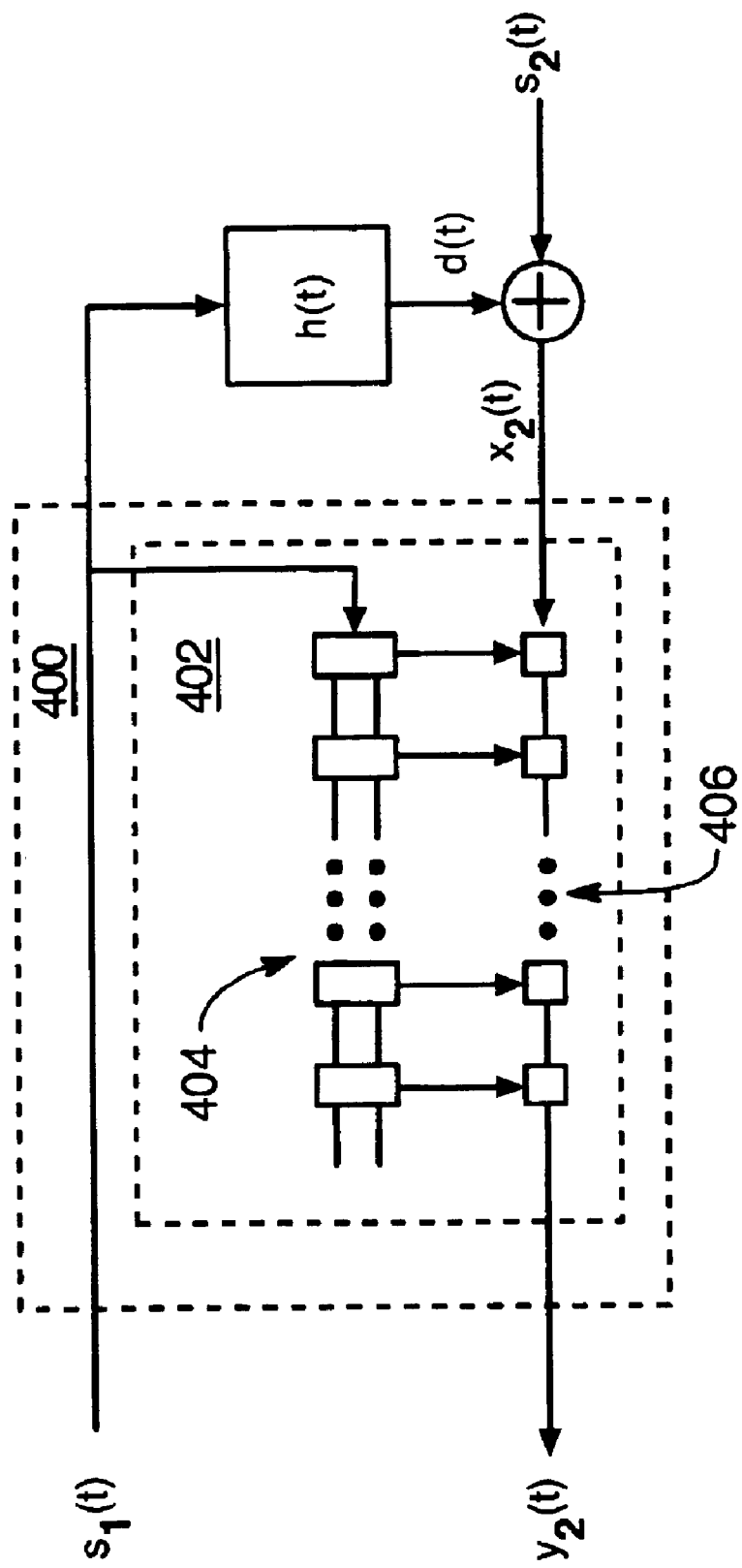
FIG. 7 is a block diagram illustrating an alternative embodiment of an echo canceler.

Referring to FIG. 7, an alternative embodiment of an echo canceler 400 of the present invention is shown. The echo canceler 400 does not include a source separating adaptive filter, such as a blind source separation module, to filter out echoes of the far-end signal $s_1(t)$. The echo canceler 400 includes a whitening and decorrelating module 402 that is embodied as an RLS lattice-ladder structure in the illustrated embodiment. The RLS lattice-ladder structure 402 is similar to the RLS lattice-ladder structure 304 used in the preprocessing module 302 of the previous embodiment. In alternative embodiments, the whitening and decorrelating module 402 may be embodied as the RLS systolic array 204 illustrated in FIG. 5.

The whitening and decorrelating operations can, by themselves, provide satisfactory echo cancellation for human perception. For nonstationary signals, the whitening and decorrelating operations, if applied over a long enough time range, force the echo canceled signal $y_2(t)$ to be statistically independent of the far-end signal $s_1(t)$.

The RLS lattice-ladder structure 402 includes a RLS lattice structure 404 such as a QR decomposition based least-squares (QRD-LSL) structure with joint process estimation. A QRD-LSL algorithm has a computational complexity that is comparable to LMS type algorithms which makes the QRD-LSL suitable for a practical implementation. The QRD-LSL structure 404 may use angle normalized a posteriori prediction errors and performs forward and backward linear prediction. When the QRD-LSL structure 404 uses angle normalized a posteriori prediction errors, it is numerically stable for implementations that use fixed point arithmetic. Other advantages of a QRD-LSL algorithm include the ability to pipeline and parallelize the implementation and the utilization of efficient CORDIC structures that perform the required coordinate rotations with a minimum of multiplications. As is known in the art, the QRD-LSL structure 404 uses an exponential forgetting factor 8 in calculations according to the heuristics discussed below.

The lattice structure 404 receives and whitens the far-end signal $s_1(t)$. The backward prediction errors are whitened time lags of the far-end signal $s_1(t)$.

The RLS lattice-ladder structure 402 further includes a ladder structure 406 that operates in parallel with the lattice structure 404 and performs the decorrelation function. The ladder structure 406 receives the microphone signal $x_2(t)$ and the whitened time lags of the far-end signal $s_1(t)$. The microphone signal $x_2(t)$ consists of the near-end signal $s_2(t)$ plus multiple time delays of the far-end signal $s_1(t)$. By decorrelating the microphone signal $x_2(t)$ with time delays of the far-end signal $s_1(t)$, the echoes of the far-end signal $s_1(t)$ in the decorrelated microphone signal $x_2(t)$ are reduced. Decorrelating $x_2(t)$ from the whitened time lags of $s_1(t)$ can be seen as performing a partial echo cancellation.

In one implementation, the ladder structure 406 computes a joint process estimation error which is a version of the microphone signal $x_2(t)$ that has been decorrelated with all the whitened time lags of the far-end signal $s_1(t)$. Therefore, the joint process estimation error at the end of the ladder structure 406 may be taken as the echo canceled signal $y_2(t)$.

The near-end signal $s_2(t)$ is primarily nonstationary while the response of the enclosure is relatively stationary. Stationarity is a measure of how rapidly the statistics of the near-end signal $s_2(t)$ or the response of the enclosure change with time. Based on these principles, whitening and decorrelating provide sufficient echo cancellation.

Forcing the echo canceled signal $y_2(t)$ to be uncorrelated with all lags of the far-end signal $s_1(t)$ over some temporal window can be sufficient for echo cancellation during a double-talk event. Correlation includes linear and nonlinear correlation. For example, $E\{XY\}$ is linear correlation while $E\{Xg(Y)\}$ is a nonlinear correlation where g is a nonlinear function such as the hyperbolic tangent function.

The time window over which decorrelation is enforced can be a growing memory window which weights equally all data observed up to the current time. Alternatively, a weighting function may be applied so that the effects of "old" data on the current decorrelation are forgotten. Examples of weighting functions include exponential weighting functions and sliding rectangular (or shaped) weighting functions.

Exponential weighting functions weight the observations according to their age. The function is such that old data is essentially forgotten. Therefore, exponential windows have an effective window size $N=1/(1-8)$. The forgetting factor, 8, is a small positive number, $0<8\leq1$ which is typically chosen close to 1. If $8=1$ then the effective window size is infinite and all observations are weighted equally. A sliding window uses only N of the last observations. As can be appreciated, other weighting functions are also possible. Whether or not the decorrelation condition actually is effective for echo cancellation during a double-talk event depends on the effective window size (length).

RLS type algorithms are more effective than least-means square (LMS) type algorithms for decorrelation. The reason is that RLS algorithms decorrelate as far as possible at every iteration while LMS algorithms decorrelate only on average. Thus, RLS algorithms perform optimum decorrelation after processing each observed sample. Additionally, LMS algorithms are based on gradient updates that are subject to transients in tracking performance. The RLS family of algorithms update the exact solution of the normal equations at every step. The normal equations characterize the optimum decorrelating solution.

One of skill in the art will appreciate that the whitening and decorrelating module 702 may use any number of RLS algorithms, all of which are included within the scope of the invention. Thus, reference to specific RLS algorithms is for illustrative purposes only and is not limiting of the present invention. There are a large number of variants of RLS algorithms which can be used and are equally as effective. Underlying all of these algorithms is the principle of decorrelation.

The mechanism that makes decorrelation effective is the nonstationarity of the near-end signal $s_2(t)$ and the relative stationarity of the enclosure response $h(t)$. The statistics of the near-end signal $s_2(t)$ change very rapidly compared to the changes associated with the enclosure response $h(t)$.

In one example, the near-end signal $s_2(t)$ is speech. The statistics (i.e., the correlation function) of speech changes very rapidly. The statistics of speech may change several times in very short utterances. For example, the statistics of an utterance of the word "six" change three or four time during the utterance. It takes less than a second to pronounce the word "six." The enclosure response $h(t)$ may be changing too but the time scale of such changes is much slower, such as on the order of a second. It is this relative difference in the rate of change of the statistics of the near-end signal $s_2(t)$ and the enclosure response $h(t)$ that makes echo cancellation during double-talk possible by whitening and decorrelating the microphone signal $x_2(t)$.

Conventional echo cancelers use decorrelation to cancel echoes during far-end talk but fail to cancel echoes during double-talk. In conventional echo cancelers, a gradient type algorithm such as LMS, which decorrelates on average, is used. In the present invention, the chosen algorithm forces exact decorrelation, or to the greatest extent possible, over some temporal window. The LMS algorithm can not accomplish this whereas RLS algorithms can. RLS algorithms are not typically used in echo cancelers because of their computational complexity and acoustic echo path lengths are usually very long.

The whitening and decorrelating module 402 uses a highly efficient variant of the RLS algorithm that has a computational complexity that is the same order as that for the LMS algorithm and is therefore feasible for a practical implementation. The whitening and decorrelating module 402 further carefully selects the effective window length. The window length determines the rate at which the decorrelation processing tracks changes in the statistics of the near-end signal $s_2(t)$ and the enclosure response $h(t)$. All decorrelation algorithms accumulate and use sample statistics. Sample statistics are accumulated for observations within the effective time window. Therefore, the effective length of the time window determines how accurately the sample statistics represent the actual (true ensemble averaged) statistics.

The sample statistics calculated by and used in decorrelation algorithms are effectively accumulated over an N sample window. Over very short windows, such as N≈200 samples at $f_s$=8000 Hz signals, speech is often modeled as being wide sense stationary. This means that the statistics are not changing with time. Additionally, two independent signals, jointly stationary or jointly nonstationary, can have strong cross correlation as measured by sample statistics computed over a short period of time. The echo canceler 400 forces the echo canceled signal $y_2(t)$ to be uncorrelated with all the delays of the far-end signal $s_1(t)$ over the N sample window. Due to the possibility of strong short term sample cross correlation, the components of the near-end signal $s_2(t)$ that are correlated with the far-end signal $s_1(t)$ are canceled along with the far-end signal $s_1(t)$ and are not present in the echo canceled signal $y_2(t)$. Because of the short term average, it is often the case that most of the near-end signal $s_2(t)$ is correlated with the far-end signal $s_1(t)$ and the result is that the near-end signal $s_2(t)$ is often, almost entirely, suppressed by the decorrelation operation.

It is preferable to select the effective window length N so that the whitening and decorrelating module 402 can track changes in the enclosure response $h(t)$ but can not track rapid changes in the signals themselves. Therefore, it is implicitly assumed that the rate at which the enclosure changes is much less than the rate at which the signals, such as music or speech, change. This is a reasonable assumption that holds nearly all the time since speech signals change rapidly. The statistics of a speech signal change several times within the utterance of a word. In fact, information is conveyed through speech because of these rapid changes. The enclosure is changing much more slowly than the voice patterns of a speaker.

Occasionally, the enclosure response may change very rapidly such as when a door is opened quickly or when some other large object moves rapidly. When changes in the enclosure response take place at a rate similar to the rate at which the speech is changing, then, at those instances, echoes of the far-end signal $s_1(t)$ will leak into the echo canceled signal $y_2(t)$. The enclosure itself produces a distortion on the far-end signal $s_1(t)$ that is indistinguishable from the near-end signal $s_2(t)$ from the standpoint of its sample statistics over the N sample window.

When a larger forgetting factor 8 is used in an exponential window, closer to 1.0, the effective window length N increases accordingly. As the window length increases, more data points are accounted for in the sample statistics. The sample cross correlation of independent signals is closer to zero, the true ensemble average, as the amount to date included increases.

However, there are two effects on the echo canceled signal $y_2(t)$ as the effective window size increases. First, the longer the effective window length, the more accurately the near-end signal $s_2(t)$, speech or otherwise, is reproduced in the echo canceled signal $y_2(t)$. This is due to higher quality sample statistics used in decorrelation that result from the longer window. At $f_s$=8000 Hz sample rate, speech is reproduced with high quality for N=1000 samples. The longer the effective window, the better the quality of the speech and the better the suppression of the far-end signal $s_1(t)$, i.e., the better the cancellation of the echoes.

As the window length grows, however, a reverberation sounding artifact may be introduced into the echo canceled signal $y_2(t)$. It is important to note that the reverb is introduced at points in time when the far-end signal $s_1(t)$ is "off." In other words, when there is no far-end echo to cancel. This is a situation that is easily detected. When there is no far-end signal $s_1(t)$, the microphone signal $x_2(t)$ can simply be sent back to the far-end 10. As the signal energy in the speaker output grows, double-talk returns and the echo canceled signal $y_2(t)$ can be switched back in.

In summary, when there is no echo to cancel, the echo canceler 700, which is designed to work when there is double-talk, continues to perform decorrelation. However, when there is no far-end signal $s_1(t)$ to decorrelate then an artifact introduced into the echo canceled output sounds like a reverberation of the near-end signal $s_2(t)$. The longer the effective time window, the more severe the reverberation introduced into the near-end signal $s_2(t)$. Therefore, the only situation in which the echo-canceler 700 produces an artifact is during near-end talk.

The present invention provides an echo canceler that whitens a far-end signal $s_1(t)$ to provide time delays. The echo canceler further decorrelates a microphone signal based on the time delays to reduce echoes from the far-end signal $s_1(t)$. The echo canceler does not use a double-talk detector and avoids all problems inherent with their use. Thus, speaker phones, and other communication devices, can continuously operate in full-duplex mode of operation thereby providing natural conversational hands-free communication.

It will be obvious to those having skill in the art that many changes may be made to the details of the above-described embodiments without departing from the underlying principles of the invention. The scope of the present invention should, therefore, be determined only by the following claims.

What is claimed is:

1. An echo canceler for reducing echoes resulting from a far-end signal, the echo canceler comprising:
   a recursive least squares lattice structure to receive and whiten the far-end signal; and
   a ladder structure to receive time delays of the far-end signal and to receive and decorrelate a microphone signal with the time delays to provide an echo canceled signal.

2. The echo canceler of claim 1, wherein the recursive least squares lattice structure includes a QR decomposition based least-squares structure.

3. The echo canceler of claim 2, wherein the QR decomposition based least squares structure provides angle normalized a posteriori prediction errors to perform forward and backward linear prediction.

4. The echo canceler of claim 1, wherein the ladder structure is further to calculate a joint process estimation error.

5. A method for reducing echoes resulting from a far-end signal, the method comprising:
   receiving a microphone signal including a near-end signal and echoes;
   whitening the far-end signal to provide whitened time delays; and
   decorrelating a microphone signal based on the whitened time delays of the far-end signal to provide an echo canceled signal.

6. The method of claim 5, wherein whitening the far-end signal is performed by a recursive least-squares lattice structure.

7. The method of claim 6, wherein the recursive least squares lattice structure includes a QR decomposition based least-squares structure.

8. The method of claim 7, wherein whitening the far-end signal further includes the QR decomposition based least squares structure providing angle normalized a posteriori prediction errors and performing forward and backward linear prediction.

9. The method of claim 5, wherein decorrelating the microphone signal is performed by a ladder structure.

10. The method of claim 9, wherein decorrelating the microphone signal further includes the ladder structure performing a joint process estimation error.

11. The method of claim 5, wherein whitening the far-end signal and decorrelating the microphone signal is performed by a recursive least-squares systolic array.

12. The method of claim 5, further comprising selecting a time window and wherein decorrelating the microphone signal is performed over the time window.

13. The method of claim 12, further comprising equally weighting data representing the microphone signal and received during the time window.

14. The method of claim 12, further comprising applying a weighting function to data representing the microphone signal and received during the time window.

15. The method of claim 14 wherein the weighting function is an exponential weighting function.

16. The method of claim 14, wherein the weighting function is sliding weighting function.

17. A method for reducing echoes resulting from a far-end signal, the method comprising:
   receiving a microphone signal including a near-end signal and echoes;
   a recursive least squares lattice structure whitening the far-end signal to provide time delays; and
   a ladder structure receiving the time delays and decorrelating a microphone signal based on the time delays to provide an echo canceled signal.

18. The method of claim 17, wherein the recursive least squares lattice structure includes a QR decomposition based least-squares structure.

19. The method of claim 18, wherein whitening the far-end signal further includes the QR decomposition based least squares structure providing angle normalized a posteriori prediction errors and performing forward and backward linear prediction.

20. The method of claim 17, wherein decorrelating the microphone signal further includes the ladder structure performing a joint process estimation error.

21. The method of claim 17, further comprising selecting a time window and wherein decorrelating the microphone signal is performed over the time window.

22. The method of claim 21, further comprising equally weighting data representing the microphone signal and received during the time window.

23. The method of claim 21, further comprising applying a weighting function to data representing the microphone signal and received during the time window.

24. The method of claim 23, wherein the weighting function is an exponential weighting function.

25. The method of claim 23, wherein the weighting function is sliding weighting function.

* * * * *

UNITED STATES PATENT AND TRADEMARK OFFICE
CERTIFICATE OF CORRECTION

PATENT NO. : 6,954,530 B2
APPLICATION NO. : 10/759626
DATED : October 11, 2005
INVENTOR(S) : Jacob H. Gunther It is certified that error appears in the above-identified patent and that said Letters Patent is hereby corrected as shown below:

On the title page, item [57]: ABSTRACT, line 1, "… includes an recursive …" change to --includes a recursive--

Column 1, line 4, "… is a cont.-in-part of …" change to --claims priority to--

Column 1, line 7, "... Cancellation Filter and is hereby …" change to --Cancellation Filter, which is hereby--

Column 2, line 14, "… cancellers perspective …" change to --canceler's perspective--

Column 2, line 66, "… response during far-end …" change to --response during a far-end--

Column 4, line 31, "… a RLS systolic array or a RLS …" change to --an RLS systolic array or an RLS--

Column 4, line 62, "… set of signals are also …" change to --set of signals is also--

Column 5, line 57, "... FIGS. 5 is a …" change to --FIG. 5 is a--

Column 7, line 46, "… signal is $s_2(t)$ …" change to --signal $s_2(t)$ is--

Column 8, line 34, "… arrive at N sensors, …" change to --arrives at N sensors,--

Column 9, line 12, "… anti-variance guassian random …" change to --anti-variance gaussian random--

Column 9, lines 12-13, "… G(y)=log cos h y. An independent …" change to --G(y)=log cosh(y). An independent--

Column 10, line 5, "… 106 serve to whiten …" change to --106 which serve to whiten--

Column 10, line 19, "… may be a FIR other filters …" change to --may be an FIR or other filters--

Column 10, line 42, "… G(y)=log cos h(y) …" change to --G(y)=log cosh(y)--

UNITED STATES PATENT AND TRADEMARK OFFICE
CERTIFICATE OF CORRECTION

| | | |
|---|---|---|
| PATENT NO. | : 6,954,530 B2 | |
| APPLICATION NO. | : 10/759626 | |
| DATED | : October 11, 2005 | |
| INVENTOR(S) | : Jacob H. Gunther | |

It is certified that error appears in the above-identified patent and that said Letters Patent is hereby corrected as shown below:

Column 10, line 43, "… g(y)=tan h(y). …" change to --g(y)=tanh(y).--

Column 10, line 52, "… as a RLS systolic …" change to --as an RLS systolic--

Column 10, line 60, "… a RLS lattice-ladder …" change to --an RLS lattice-ladder--

Column 11, line 18, "… includes a RLS lattice …" change to --includes an RLS lattice--

Column 11, line 34, "… forgetting factor 8 in …" change to --forgetting factor *8* in--

Column 12, lines 14-15, "… size N=1(1-8). The forgetting factor, 8, is a small …" change to --size N=1(1-*8*). The forgetting factor, *8*, is a small--

Column 12, line 16, "… If 8=1 then the …" change to --If *8*=1, then the--

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 6,954,530 B2
APPLICATION NO. : 10/759626
DATED : October 11, 2005
INVENTOR(S) : Jacob H. Gunther It is certified that error appears in the above-identified patent and that said Letters Patent is hereby corrected as shown below:

Column 12, line 52, ". . . three or four time . . ." change to --three or four times--

Column 13, line 63, ". . . forgetting factor 8 is used . . ." change to --forgetting factor *8* is used--

Column 14, line 38, ". . . inherent with their use." change to --inherent with its use.--

Column 16, line 2, ". . . is sliding weighting function." change to --is a sliding weighting function.--

Column 16, line 37, ". . . is sliding weighting function." change to --is a sliding weighting function.--

Signed and Sealed this

Fifteenth Day of December, 2009

David J. Kappos
*Director of the United States Patent and Trademark Office*